UNITED STATES PATENT OFFICE.

EDWARD FARWELL, OF WEYMOUTH, ENGLAND.

METHOD OF MAKING BREAD.

1,040,660.  Specification of Letters Patent.  Patented Oct. 8, 1912.

No Drawing.  Application filed February 26, 1912.  Serial No. 680,024.

*To all whom it may concern:*

Be it known that I, EDWARD FARWELL, a subject of the King of Great Britain and Ireland, and resident of Weymouth, county of Dorset, England, have invented certain new and useful Improvements in the Method of Making Bread, for which I have made application for a patent in Great Britain, No. 5,369, filed March 3, 1911, of which the following is a specification.

This invention relates to a new or improved method of making bread.

In bread as ordinarily made it is found that after 48 hours it becomes dry and unsalable, and, eventually, by means of the moistures, contained in the loaves, becomes mildewed, thereby making it valueless as a foodstuff. Moreover, when it is first baked it is indigestible. Further, the exterior crust is both more digestible and also contains more nutriment.

Now the object of the present invention is to produce a bread which will not only keep longer without becoming stale, and which can be treated when it has become stale and utilized, but which will also be more digestible and have the digestive properties contained in the crust of ordinary bread throughout the whole loaf.

It has been proposed to make bread suitable for invalids and hard bread and biscuits with meal or powder produced by crushing baked bread and then mixing the said meal into a paste and re-baking same, or by adding the said ground meal or powder in suitable proportions to the dough of ordinary bread.

The present invention consists in the fact that bread-like material after being first baked is reduced to a granular state and re-baked before being added to the sponge or straight dough from which the bread is to be made.

The following is an example which has been found to give good results:—To 20 lbs. of flour or flour and meal mixed I add 4 quarts of warm water, (heated to a temperature of about 110 degrees F.), 4 ozs. of salt, 4 ozs. of malt flour, and 4 ozs. of yeast, all of which are thoroughly mixed together to form a dough. This dough may be treated by the ordinary methods of dough making till ready for the oven. The mixture is then baked in an oven at a temperature of about 450 degrees F. for an hour. It is then allowed to stand for a day when it is passed through a suitable grinding machine and broken up into crumbs, the said crumbs being re-baked at a temperature of about 400 degrees F. for three-quarters of an hour, or until the crumbs assume a brown color. They are then allowed to cool and passed through a sieve or the like, to insure uniformity of size when the mixture is ready for use.

In use, the above product is added to the sponge or straight dough at the rate of about 1 oz. to 1 lb. of flour used and is thoroughly mixed into the sponge or straight dough. After mixing, the said sponge or straight dough is ready for baking in from two to three hours.

It will be seen that ordinary bread which has become stale, and, which in the usual course of events would be thrown aside as useless, can be broken up into crumbs, said crumbs being re-baked and utilized as hereinbefore described.

Having now described my invention, what I claim as new and desire to secure by Letters Patent of the United States is:—

1. The improved method of making bread which consists in reducing to a crumb-like or granular state a material similar to ordinary bread, which granulated material is then re-baked and the product added in suitable proportion to the sponge or straight dough of the bread.

2. The improved method of making bread which consists in baking a mixture in suitable proportions of flour, water, salt, malt flour and yeast, which is then ground or broken up into a crumb-like or granular state and re-baked until hard or crisp and the product added to the sponge or straight dough as required substantially as set forth.

In testimony whereof I have affixed my signature in presence of two witnesses.

EDWARD FARWELL.

Witnesses:
 FRANCIS M. MOWLAM,
 GUS. P. SYMES.